Patented June 13, 1939

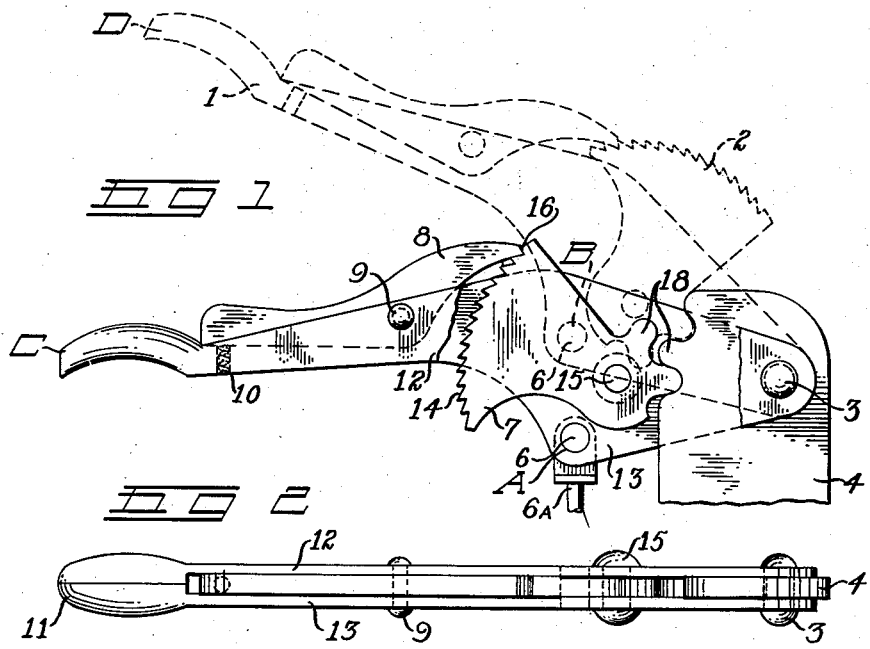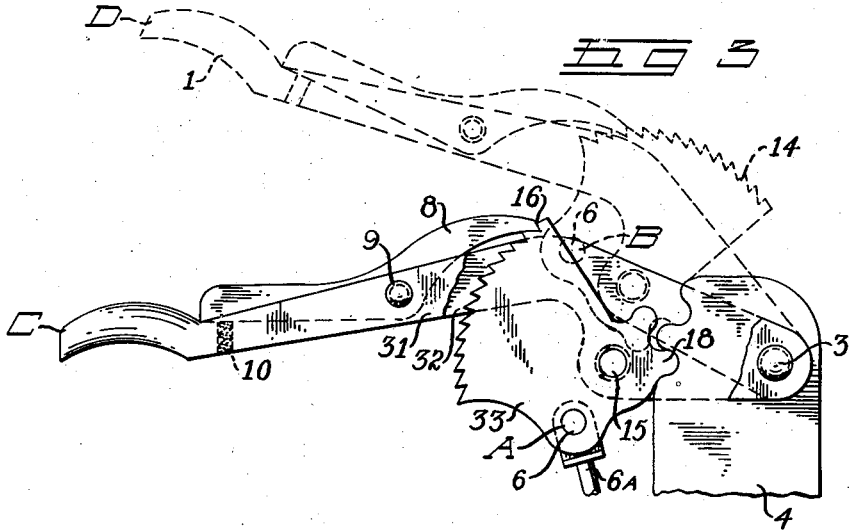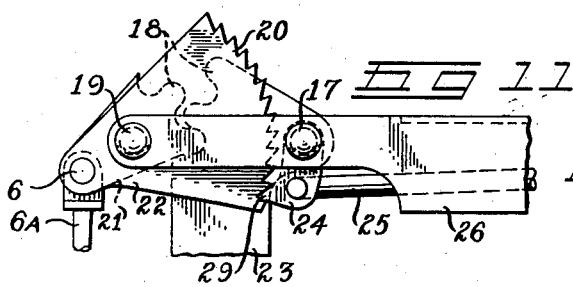

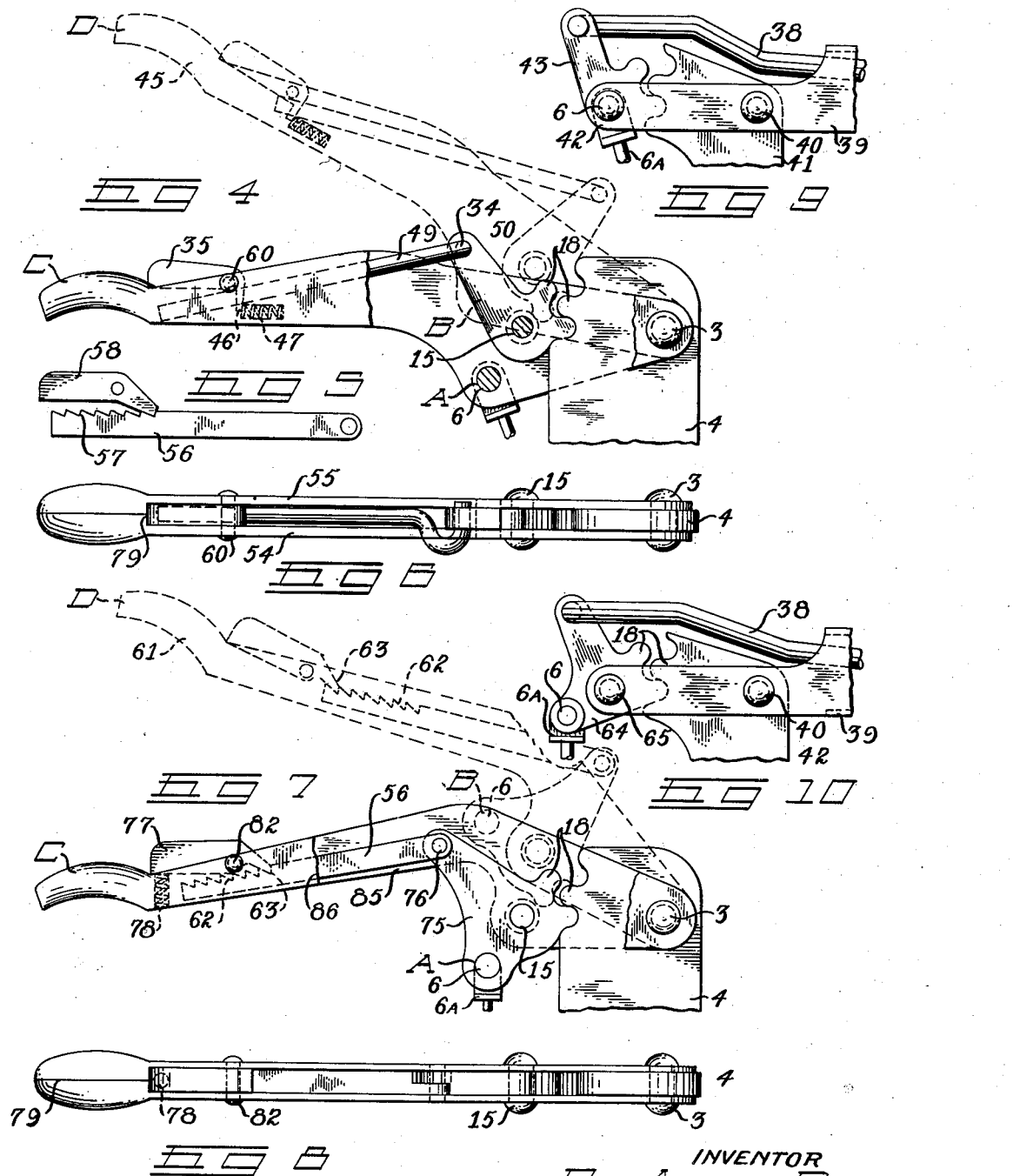

2,162,052

UNITED STATES PATENT OFFICE 2,162,052

BRAKE LEVER MECHANISM

Don Alfred Bird, Detroit, Mich.

Application January 29, 1938, Serial No. 187,633

2 Claims. (Cl. 74—530)

This invention relates to improvements in brake lever mechanism. It is illustrated as embodied in a manually operable brake lever such as is used on motor vehicles and which is commonly referred to as the emergency or parking brake lever. It is common practice to pivotally mount such lever upon a fulcrum adjacent to the floor or upon a fulcrum near the dash concealed behind the instrument panel as such panel is viewed from the seat of the driver.

An object of the invention is to provide brake lever mechanism adapted to produce ample movement of the brake linkage in the application of the brakes upon a relatively short swing of the brake lever and without reduction in the effective leverage of the lever. It has heretofore been common practice to connect the brake lever with the brake operating linkage by means of a cable or other link coupled directly with the brake lever and the movement of this cable or link was determined by the movement of its point of connection with the brake lever. Such movement might be increased by moving such point of connection toward the hand grip end of the lever but this reduced the leverage.

I propose to increase the movement of such connecting link for a given throw of the lever by coupling the link with the lever through applying means adapted to cause such link to travel with the lever but to a greater distance than the fixed point of connection with the lever. The arrangement is such that the applying mechanism couples the link with the lever so as to cause the link to overrun the lever in its swinging movement.

An important advantage of my invention, therefore, is that I am able to obtain ample movement of the brake linkage on a relatively short swing of the lever. This correlation of substantial movement of the connecting link upon a relatively short throw of the lever is particularly important with the manual brake levers which are fulcrumed near the dash panel and behind the instrument board because the permitted movement of such lever in this position is limited. Otherwise the lever will obstruct the door opening to the front seat when the lever is pulled back.

Another object of my invention is that I provide a relatively fine range of adjustment for the lever. The several permitted positions of adjustment provided with this improvement exceed those provided with the conventional lever of the ratchet adjustment type.

The invention may be embodied in lever mechanisms which differ in detail and construction from each other and which are designed for different locations on the vehicle. It may include a lever which embodies the capacity for fine adjustment together with ample and easy throw, or the fine adjustment and ample throw may be independently provided.

Other objects, advantages, and meritorious features of my invention will more fully appear from the following description, appended claims, and accompanying drawings, wherein:

Figure 1 is a side elevation of one embodiment of one form of hand lever mechanism illustrating my invention, Fig. 2 is a plan of the lever shown in Fig. 1, Fig. 3 is a side elevation of a preferred embodiment of a hand lever illustrating my invention, Fig. 4 is an elevation of a modification of the construction of Fig. 1, Fig. 5 is an elevation of a fragment of a modified form of locking lever adapted for use with lever mechanism of the type shown in Fig. 4, Fig. 6 is a plan of the lever assembly illustrated in Fig. 4, Fig. 7 is a side elevation of a modification of the construction of Fig. 3, Fig. 8 is a plan of the lever of Fig. 7, and Figs. 9, 10, and 11 each illustrate fragmentary modifications of a slightly altered form of hand lever structure resembling those shown in Figs. 1 and 3.

A preferred embodiment of my invention intended to perform the dual functions of providing ample movement of the brake actuating lever upon minimum throw of the hand lever and to provide relatively fine adjustment of position of the lever is illustrated in Fig. 3. Slightly modified embodiments of the same dual functioning lever mechanism are illustrated in Figs. 7, 8, 9, 10, and 11. An embodiment capable of performing the function of relatively fine adjustment is shown in Figs. 1, 2, 4, 5, 6, and 9.

In Fig. 1 and generally throughout the several figures of the drawings the hand lever arrangement itself indicated as 1 is shown as formed of two stamped sheet metal side pieces. In Figs. 1 and 2 these side pieces are indicated as 12 and 13. This hand lever is of the type commonly known as a parking or emergency brake lever in motor vehicle practice. It is pivoted or fulcrumed upon the floor of the vehicle or adjacent thereto or it may be supported adjacent to the dash and behind the instrument panel. It is supported upon the body or frame structure of the vehicle upon suitable bracket or support members. It is here shown in Figs. 1 and 2 as pivotally mounted upon a support or bracket 4 which may be any suitable part of the vehicle. This mounting is by means of a pivot pin, bolt, or the like indicated by the numeral 3.

As Fig. 3 represents the preferred embodiment it will be first described in detail to the extent above described. With respect to Fig. 1 it resembled the construction of Fig. 1 except that the two side plates are indicated by numerals 31 and 32. Pivotally supported between these two side plates is an applying device 33 here shown in the form of a cam or gear sector or segment. This segment is pivoted upon a pin or rivet 15 which extends between the side plates. The side plates are spaced apart opposite the segment to permit pivotal movement of the segment between said plates as shown in Fig. 3 in the two positions, namely, the position of solid line and the position of dotted line. This segment has one arcuate edge provided with ratchet teeth 14 and upon the opposite end it is provided with gear teeth or the like 18 which contact or interfit with similarly formed engaging surfaces 18 on the support or bracket 4 whereby upon swinging movement of the lever about its fulcrum point 3 the segment 33 is rotated about its pivot mounting 15 and overruns the movement of the lever. The "off" position is shown in solid line and one "on" position of mechanism is shown in dotted outline. These two positions show the overrunning of the lever by the segment.

The gear segment 33 is provided with an aperture 6 at which point a brake actuating link 6a of cable or other form is connected. This link 6a extends to any suitable part of the brake operating hook up to actuate the vehicle brakes. The brake may be of any desired mechanism—fluid or other type. This invention relates to the hand brake lever assembly and not the remaining portion of the brake mechanism or hook up.

The brake lever is held at adjusted positions of swing by a lock lever 8. This locking lever is pivoted between the side plates 31 and 32 upon a rivet 9 or the like. The locking lever 8 has a nose 16 adapted to engage successive teeth on the segment 33 to hold the segment against rotation and throughout engagement of the opposite end of the segment 18 with the support 4 to releasably hold the lever 1 in adjusted positions of swing.

It will therefore be apparent that upon swinging movement of the lever 1 upon its fulcrum point 3 the applying device or gear segment 33 rotates about its pivot 15 to overrun the corresponding portion of the lever 1 and actuate the brake linkage 6a. Such brake linkage 6a is actuated to travel a greater distance than would be the case if the link 6a were attached directly to a corresponding portion of the lever 1 and the lever swung through the same arc of travel. Furthermore, a fine range of adjustment for the hand lever is provided due to locking the same through engagement with the tooth of the rotatable segment 33 rather than through engagement of a pawl with the stationary sector. The side plates 31 and 32 are held together by pins or rivets 9, 15, and 3 and may if desired be welded or otherwise additionally secured together.

In Figs. 1 and 2 a modified form of construction is shown wherein the brake linkage 6a is attached at 6 directly to the hand lever 1. The hand lever is constructed as described in connection with the structure of Fig. 3. The side plates are numbered 12 and 13, and the ratchet sector or gear segment is indicated by the numeral 7. It is pivotally mounted between such plates upon a rivet or pin 15 to swing from the position in solid line to the position in dotted outline or any position therebetween or even beyond the position shown in dotted outline. The segment is rotated upon swinging movement of the hand lever 1 because of its engagement through teeth 18 with similarly numbered teeth upon the support 4. Such segment is provided with ratchet teeth 2 which are engaged by the nose of the locking lever 8. This locking lever is pivoted between the side members by a pivot 9 and held by a spring 10 to its locked position. The lever 8 is shown as pivoted between the side plates but it is apparent that it may be pivoted to one side if desired.

As described in connection with the construction of Fig. 3 a greater range of adjustment is provided by virtue of locking the hand lever at adjusted positions throughout segment 7. The two side portions of the hand lever are held together by the pins 9, 15, and 3 but may be additionally secured together by welding as at 11 in Fig. 2 or in any other suitable manner. The construction shown in Figs. 4, 5 and 6 resemble that of Figs. 1 and 2 in that a greater range of adjustment only is provided but there is no increase in movement of the brake actuating linkage 6a over the throw of the lever 1. In Fig. 4 element 50 corresponds to segments 7 of Fig. 1 and the applying device 33 of Fig. 3. Element 50 is pivoted between 54 and 55 on pin 15. Element 50 engages at 18 the support as described in connection with Fig. 1. To the opposite end of the element 50 bar 49 is secured as at 34. The brake actuating linkage 6a is attached at 6 directly to the hand lever.

This bar is shown as travelling between side plates 54 and 55 and is adapted to be frictionally engaged to be held releasably in adjustable positions by extending through the apertured end 46 of an L Lshaped lever 35 pivoted at 60 between the side plates and held by spring 47.

This frictionally engages the bar. Depression of the lever 35 against the resistance of the spring 47 releases the bar for movement in response to rotation of the element 50 upon swinging movement of the hand lever.

The means for holding the bar 49 might be any which was found suitable. In Fig. 5 a modified form of construction is shown. A bar 56 which corresponds to the bar 49 is shown in Fig. 5 as provided with ratchet teeth 57 adapted to be engaged by the nose of the latch element 58 which corresponds to the release lever 35 of Fig. 4. This method of adjustment gives an infinite plurality of adjusted positions, and eliminates the necessity of engagement of a pawl with the ratchet teeth. Side plates might be welded as at 79 in Fig. 6, if desired.

Figs. 7 and 8 illustrate a modification of the construction shown in Fig. 3. The applying device 75 is here pivoted as at 15 between the side plates 85 and 86 of the hand lever 1, which hand lever is fulcrumed at 3 upon the supporting bracket 4. Brake operating linkage 6a is attached at 6 to this applying means. The applying means engages as at 18 a part of the support, as heretofore described, for rotation of the applying means upon the swinging movement of the hand lever. A bar 56 is pivoted to the applying device 75 and 76. This bar has ratchet teeth 62 adapted to be engaged by nose 63 of latch lever 77 pivoted at 82, which latch is depressible against resistance of spring 78 to release the applying device to rotation upon swinging movement of the hand lever. The movement of the brake actuating link 6a is increased for a given throw of the lever as described in connection with the construction of Fig. 3.

Fig. 9 resembles Fig. 4 in that the brake actuating link 6a is attached directly to the hand lever. This hand lever is here indicated as 39. The support is here indicated as 41 and the lever 39 is fulcrumed thereon at 40. This lever is fulcrumed intermediate its ends and the broken away portion extends to the hand end of the lever. The end of the lever adjacent to the supporting standard has an element 43 pivoted at 42 thereto and the bar 38 is pivoted to one end of the element 43 and extends up along the hand lever to a point where it may be releasably secured at adjusted positions in the manner shown in Figs. 4 or 5 or in any desired manner. Fig. 10 resembles Fig. 9 in appearance but not function. It resembles the construction of Fig. 3 in that the brake actuating linkage 6a is attached at 6 to the applying member 64, which applying device is pivoted as at 65 to the hand lever which is here indicated as 39. This applying device 64 has interfitting engagement as at 18 with the support 41 as in Fig. 9 and the hand lever is pivoted at 40 to the support 41.

In Fig. 11 another modification is shown which resembles in appearance or function the construction of Fig. 10. The hand lever here indicated as 26 is fulcrumed at 17 intermediate its ends upon the stationary support 23. Such lever may comprise two side plates as hereinabove described. The applying device 21 is pivoted at 19 between the side plates of the lever and has teeth or gears 18 interfitting with corresponding teeth or gears on the support 23 as shown. Secured to the applying element 21 is ratchet segment 22 having ratchet teeth 20 adapted to be engaged by a pawl 24 connected with a bar 25 for release. The bar 25 may extend up along the hand lever as shown in Fig. 10. The brake actuating link 6a is secured at 6 to the applying device 21 into adjacent ratchet sector 22. In the several figures of the drawings the lever is shown in the "off" position at C and in the "on" position of the brake actuating linkage at D, and the point of connection 6 is shown in the "off" position at A and in the "on" position at B in the several figures of the drawings.

What I claim is:

1. In combination, a supporting standard provided with a plurality of gear teeth extending across one corner at one end thereof, a hand lever pivoted in proximity to the opposite corner of the standard at said end for swinging movement, a gear plate pivotally mounted upon the lever adjacent to said end of the standard, said gear plate provided with gear teeth extending across one corner of the side which is adjacent to the standard, said teeth being in mesh with the gear teeth on the standard, a brake actuating link pivoted to the opposite corner of the same side of the gear plate, and means engaging the opposite side of the gear plate from said gear teeth and brake actuating lever releasably operable to hold the plate and the lever at adjusted positions of swingable movement.

2. In combination, a supporting standard provided with a plurality of gear teeth extending across one corner at one end thereof, a hand lever pivoted in proximity to the opposite corner of the standard at said end for swinging movement, a gear plate pivotally mounted upon the lever adjacent to said end of the standard, said gear plate provided with gear teeth extending across one corner of the side which is adjacent to the standard, said teeth being in mesh with the gear teeth on the standard, a brake actuating link pivoted to the opposite corner of the same side of the gear plate, said gear plate provided on the side opposite said gear teeth and brake actuating link with ratchet teeth extending therealong, and manually operable means carried by the lever adapted to engage said ratchet teeth to hold the gear plate and the brake lever at adjusted positions of swingable movement.

DON ALFRED BIRD.